United States Patent [19]

Adams

[11] Patent Number: 4,568,831

[45] Date of Patent: Feb. 4, 1986

[54] CHOPPED MOLECULAR BEAM MULTIPLEXING SYSTEM

[75] Inventor: Billy R. Adams, Newport News, Va.

[73] Assignee: The United States of America as represented by the Administrator of the National Aeronautics and Space Administration, Washington, D.C.

[21] Appl. No.: 602,105

[22] Filed: Apr. 19, 1984

[51] Int. Cl.[4] .......... B01D 59/44

[52] U.S. Cl. .......... 250/281; 250/282

[58] Field of Search .......... 250/251, 281, 282, 283, 250/288

[56] References Cited

U.S. PATENT DOCUMENTS

| | | | |
|---|---|---|---|
| 2,829,259 | 4/1958 | Foner et al. | 250/300 |
| 3,924,124 | 12/1975 | Favre et al. | 250/281 |
| 4,068,122 | 1/1978 | Schmidt et al. | 250/281 |
| 4,258,257 | 3/1981 | Brackmann | 250/281 |
| 4,258,427 | 3/1981 | Favre et al. | 250/281 |
| 4,263,507 | 4/1981 | Schmidt | 250/281 |

*Primary Examiner*—Bruce C. Anderson

*Attorney, Agent, or Firm*—Howard J. Osborn; John R. Manning; William H. King

[57] ABSTRACT

A chopped molecular beam mass spectrometry measuring system (11, 12, 13, 14, 20) has its measurement time multiplexed (25, 26). The chopping of the molecular beam is synchronized with the multiplexing (chopper 21, OR gate 32, phase detector 35 and voltage controlled oscillator 36). Means 34 are provided for phase shifting the chopper 21 with respect to the multiplexing. A four channel amplifier 26 (disclosed in detail in FIGS. 3 and 4) is provided for independently varying the baseline and the amplitude in each channel of the multiplexing.

14 Claims, 4 Drawing Figures

CHOPPED MOLECULAR BEAM MULTIPLEXING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to mass spectrometry and more specifically concerns improvements in time-multiplexed mass spectrometry.

In chopped molecular beam mass spectrometry systems there is often a need to make several near-simultaneous measurements. This can be accomplished by time multiplexing. That is, several measurements are made and each measurement is sampled in a different assigned time interval within a time frame. The time frames are repeated many times. Hence, if the repeated time frames are displayed on an oscilliscope the averages of the different time intervals can be viewed. However, when a chopped molecular beam measuring system is time multiplexed there are several requirements of the combined system: The multiplexing must be synchronized with the chopper of the measuring system such that there is one transition of the chopper (a change from blocking the molecular beam to not blocking the molecular beam by the chopper) during each time interval. Otherwise, the measurements during each time interval of the multiplexing would not be capable of digital averaging over many repetitions of a time frame. There must be a capability for phase shifting the chopper with respect to the time intervals so that at a selected time during each multiplexing time interval there is a transition. Thus, a measurement of the effect of a transition can be made during each time interval at a selected time. The base lines of the measurements during the different time intervals should have the same reference level. That is, the measurements during all time intervals while the chopper is blocking the molecular beam should be the same. There should be the capability of independently varying the gain of each channel of the multiplexing system. There should be provided a means for blanking a measurement for a short period of time following the beginning of each time interval to allow for settling time.

It is therefore an object of this invention to time multiplex the measurements from a chopped beam measuring system.

Another object of this invention is to provide apparatus for time multiplexing the measurements from a chopped beam measuring system such that the measurements during each time interval are capable of digital averaging over many repetitions of a time frame.

A further object of this invention is to time multiplex the measurements from a chopped beam measuring system and synchronize the transitions made by the chopper with the time multiplexing time intervals.

Still another object of this invention is to time multiplex the measurements from a chopped beam measuring system, synchronize the transitions made by the chopper with the time multiplexing time intervals and provide means for phase shifting the transitions with respect to the time intervals.

A still further object of this invention is to time multiplex the measurements from a chopped beam measuring system and provide means for independently changing the reference level of the baseline in each time interval in a multiplexing time frame.

Yet another object of this invention is to time multiplex the measurements from a chopped beam measuring system and provide means for independently varying the amplitudes of the measurements in each time interval in a multiplexing time frame.

Yet still another object of this invention is to time multiplex the measurements from a chopped beam measuring system and provide means for blanking the measurements for a short period of time following the beginning of each time interval to allow for settling time.

Other objects and advantages of this invention will become apparent hereinafter in the specification and drawings.

SUMMARY OF THE INVENTION

The invention consists essentially of a system for time multiplexing measurements made by a chopped molecular beam/mass spectrometer measuring system. A molecular beam is chopped by a chopper that is controlled by a synchronous motor. The frequencies of the multiplexing time intervals and of the chopper transitions are compared and if there is a difference, a difference signal is applied to the synchronous motor to change its speed to thereby synchronize the chopper transitions with the multiplexing time intervals. Means are provided for changing the phase of the chopper transition frequency to make the chopper transitions occur at a chosen point within all time intervals. Means are provided for independently adjusting the baselines of each of the time intervals to make the baselines of all of the time intervals the same. Means are provided for independently adjusting the amplitudes of the measurements in the different time intervals and means are provided for blanking measurements for a short period of time following the beginning of each time interval to allow for settling time before a transition.

DETAILED DESCRIPTION OF THE INVENTION

Figure 1:
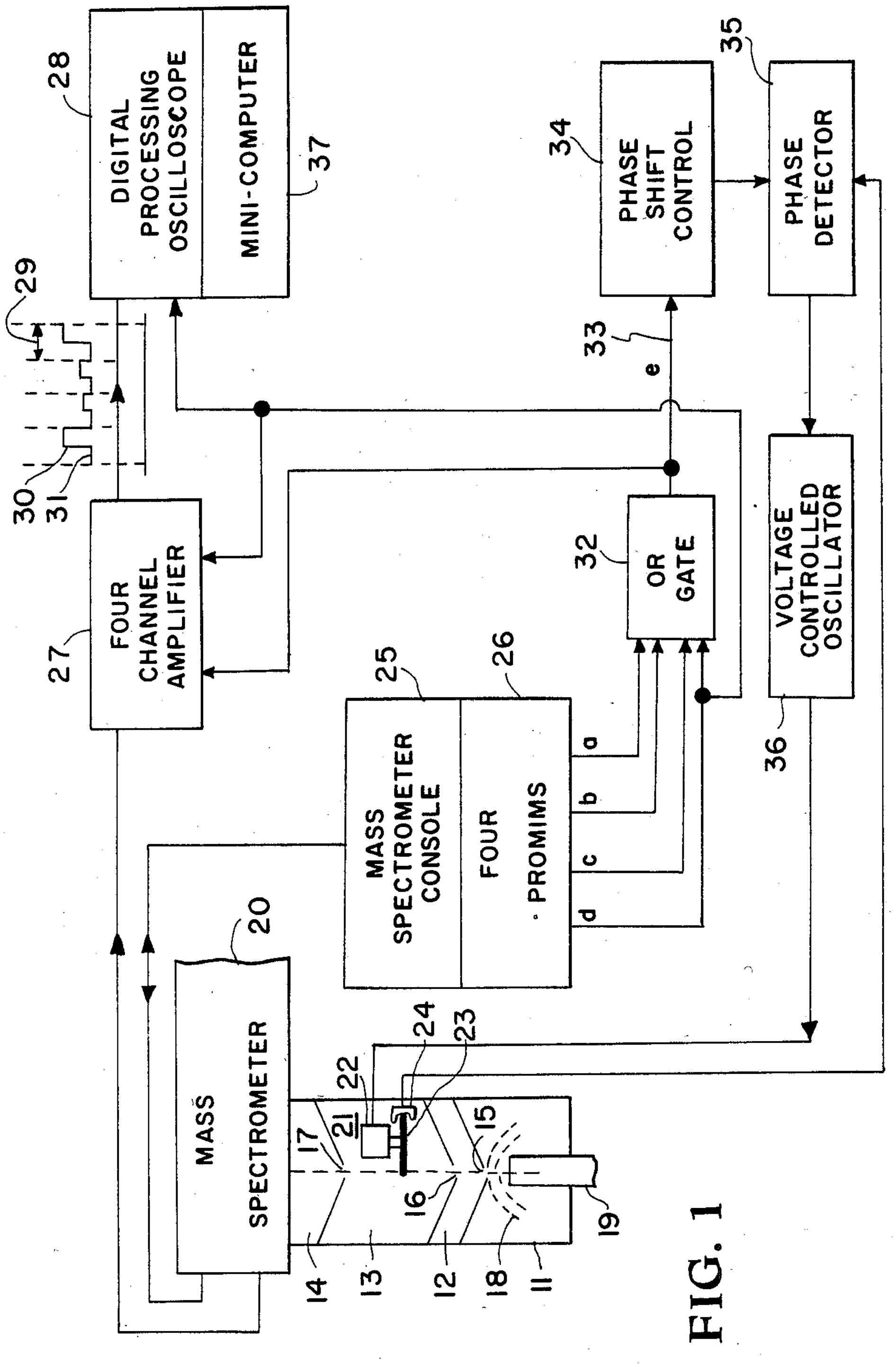
FIG. 1 is a block diagram of the invention.

Turning now to the embodiment of the invention selected for illustration in the drawings, the number 11 in FIG. 1 designated a molecular beam sampler. Sampler 11 includes several compartments 12, 13 and 14 with orifices 15, 16 and 17 leading into the compartments. The compartments are pumped by means not shown to create vacuums in the compartments with compartment 14 having the highest vacuum, with compartment 13 having the next highest vacuum and with compartment 12 having the lowest vacuum. The gas to be analyzed enters the sampler 11 through a nozzle 19 near orifice 15. Consequently, due to the increasing vacuum in the compartments the gas will flow through orifices 15, 16 and 17 into a mass spectrometer 20 where measurements of the gas are made. The measurements of the gas can be, for example, the measurement of the amount of a first element in the gas, the measurement of the amound of a second element in the gas, etc.

A chopper 21 including a synchronous motor 22 and a disc 23 that is located in the path of the gas as it flows through the sampler 11. Disc 23 has two of its opposite quadrants cut away such that as the disc is rotated by motor 22, the disc will alternately block the flow of the gas and then allow the gas to flow through to the mass spectrometer 20. Chopper 21 can take many different forms as long as it alternately blocks and allows the gas to pass through. A detector 24 is located at the edge of disc 23 opposite the side of the disc where the gas flows. A detector 24 includes a light source (not shown) located on one side of the disc and a light detector (not shown) on the other side of the disc. Hence, anytime the gas is flowing through disc 23, the opposite opening of disc 23 is passing detector 21 causing it to generate a signal.

Figure 2:
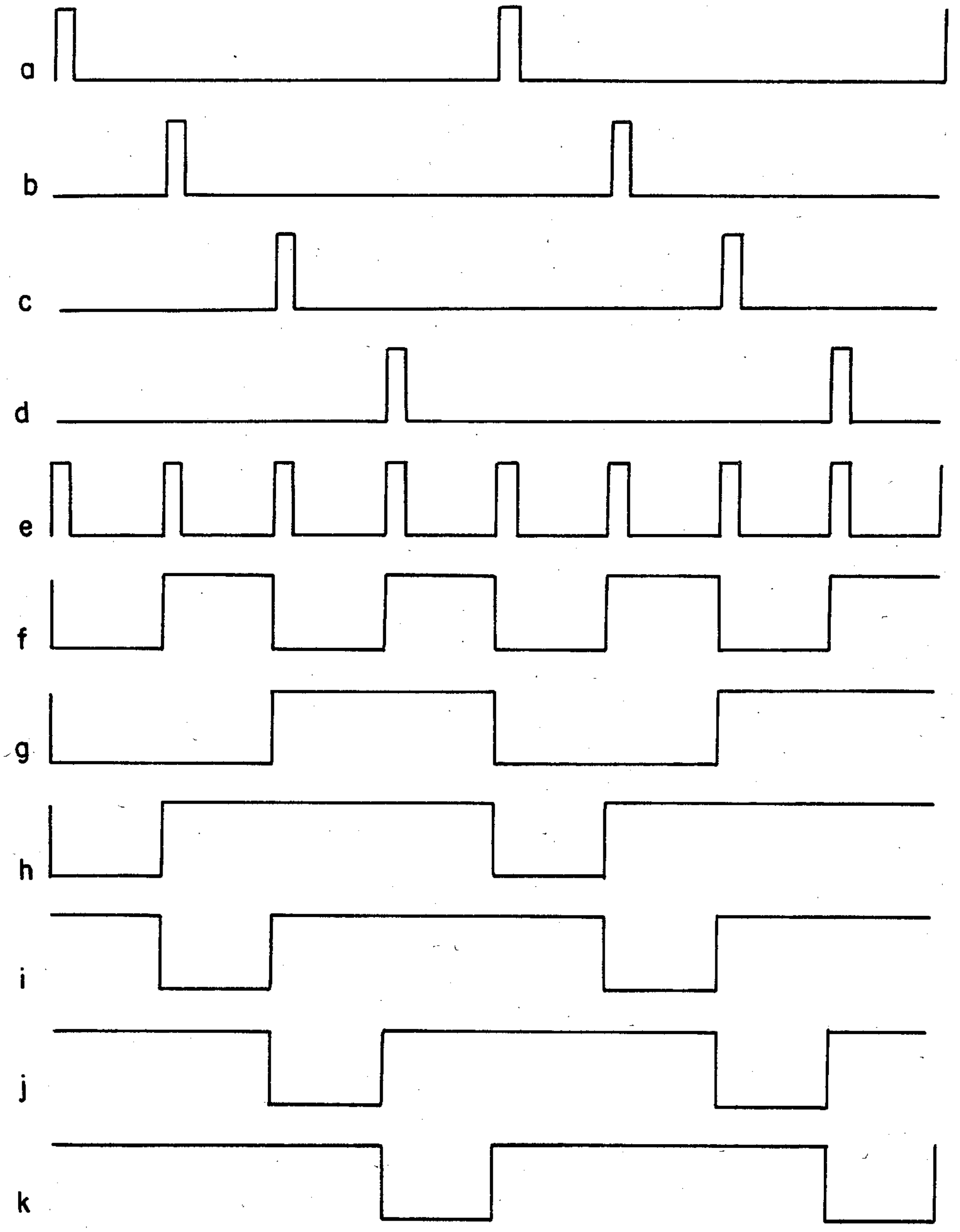
FIG. 2 is a drawing of the waveforms generated for the purpose of describing the invention.

A mass spectrometer console 25 with a four promins (programmable multiple ion monitoring) 26 attached is connected to the mass spectrometer 20 to time multiplex four measurements made by the mass spectrometer. The multiplexed output of mass spectrometer 20 is applied to a four channel amplifier 27 which is disclosed in FIGS. 3 and 4, and will be described in more detail below. The output of amplifier 27 is connected to a digital processing oscilloscope 28 which is attached to a minicomputer 37. The four promins 26, in addition to aiding in the multiplexing, generates four timing signals a, b, c and d as shown in FIG. 2. The mass spectrometer 20, console 25 and four promins 26 are commercially available from the Finnagan Corporation and are not disclosed in detail in this specification.

A diagram of one complete time frame of the multiplexed measurements of mass spectrometer 20 is shown at the output of amplifier 26. A time frame is comprised of four equal time intervals 29. During each time interval 29 there is a transition 30. A transition is a change in the rotational position of disc 23 from where it is blocking the flow of gas to where it is not blocking the flow of gas. The measurement of a transition is from a baseline 31. Note that it is important that the frequency of the transitions be equal to the frequency of the time intervals. Otherwise, the transitions will not appear in the assigned time intervals for a large number of repetitions of the time frames. Also note that the transitions should appear approximately in the center of the time intervals so that they are easily measured. In addition, the baselines should all be the same to better interpret the data. Repetitions of the different time intervals are referred to as channels. That is, repetitions of the first time interval are referred to as channel 1, repetitions of the second time interval are referred to as channel 2, etc.

The timing signals a, b, c and d from four promins 26 are applied to an OR gate 32 to put all the signals on a single line 33 as shown in FIG. 2*e*. The output of OR gate 32 is applied through a phase shift control 34 to a phase detector 35 and the output of the detector 24 is applied to the phase detector 35. A voltage controlled oscillator 36 produces a signal that is applied to synchronous motor 21 to maintain the rotational speed of disc 23 such that the frequency of the transitions is equal to the frequency of the time intervals. If there is a difference in the two frequencies, the difference is detected by phase detector 35 which changes the output of VCO 36 to either speed up or slow down the rotational speed of disc 23 to make the two frequencies equal. While varying oscilloscope 28, the phase shift control 34 can be varied to shift the transitions to approximately the centers of the time intervals. The output of OR gate 32 is also applied to the four channel amplifier 27. The d timing signal is applied to the amplifier 27 and oscilloscope 28 for synchronizing them with the multiplexing system.

Figure 3:
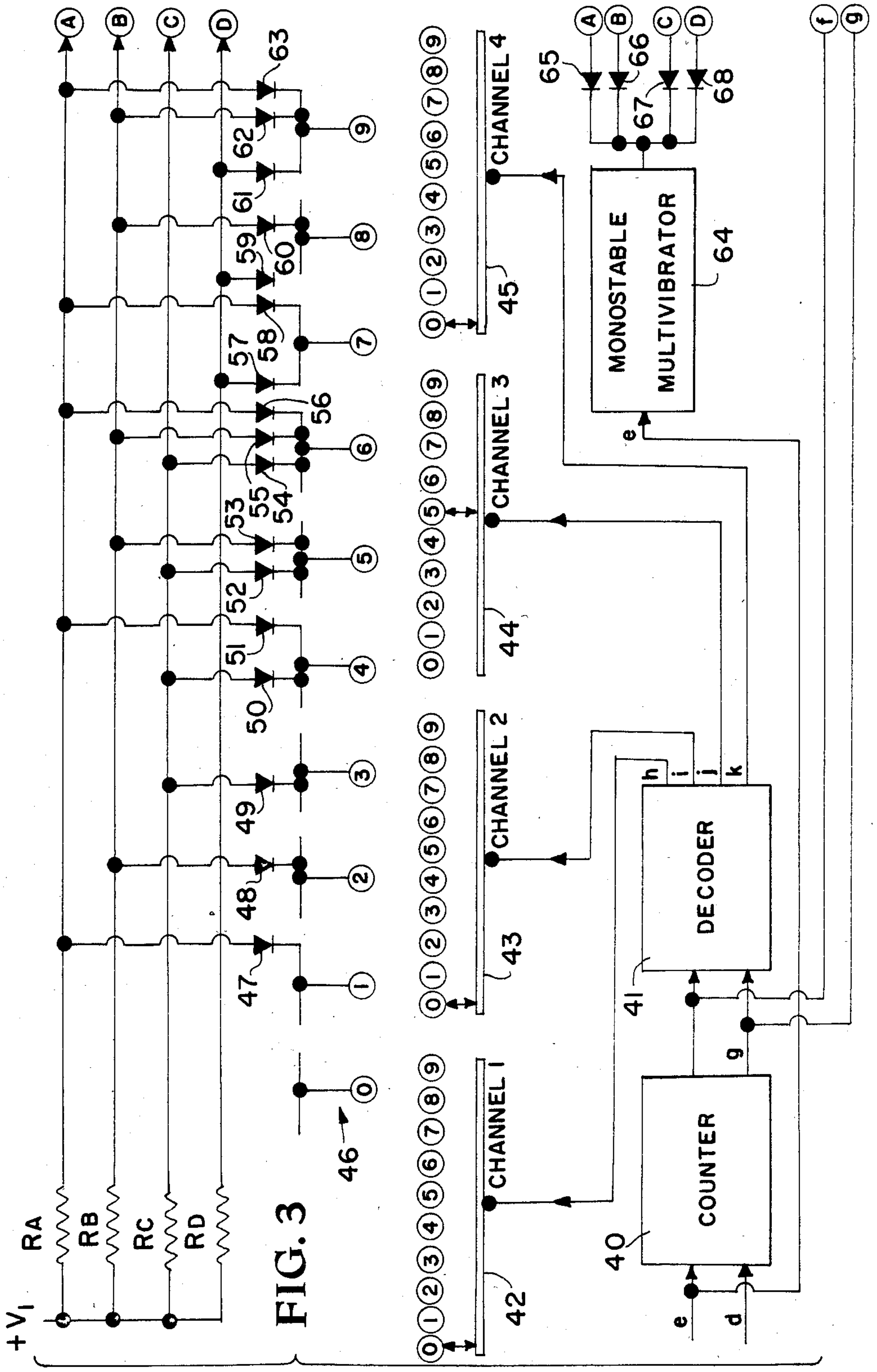
FIGS. 3 and 4 are schematic drawings of the four channel amplifier disclosed in FIG. 1.
Figure 4:
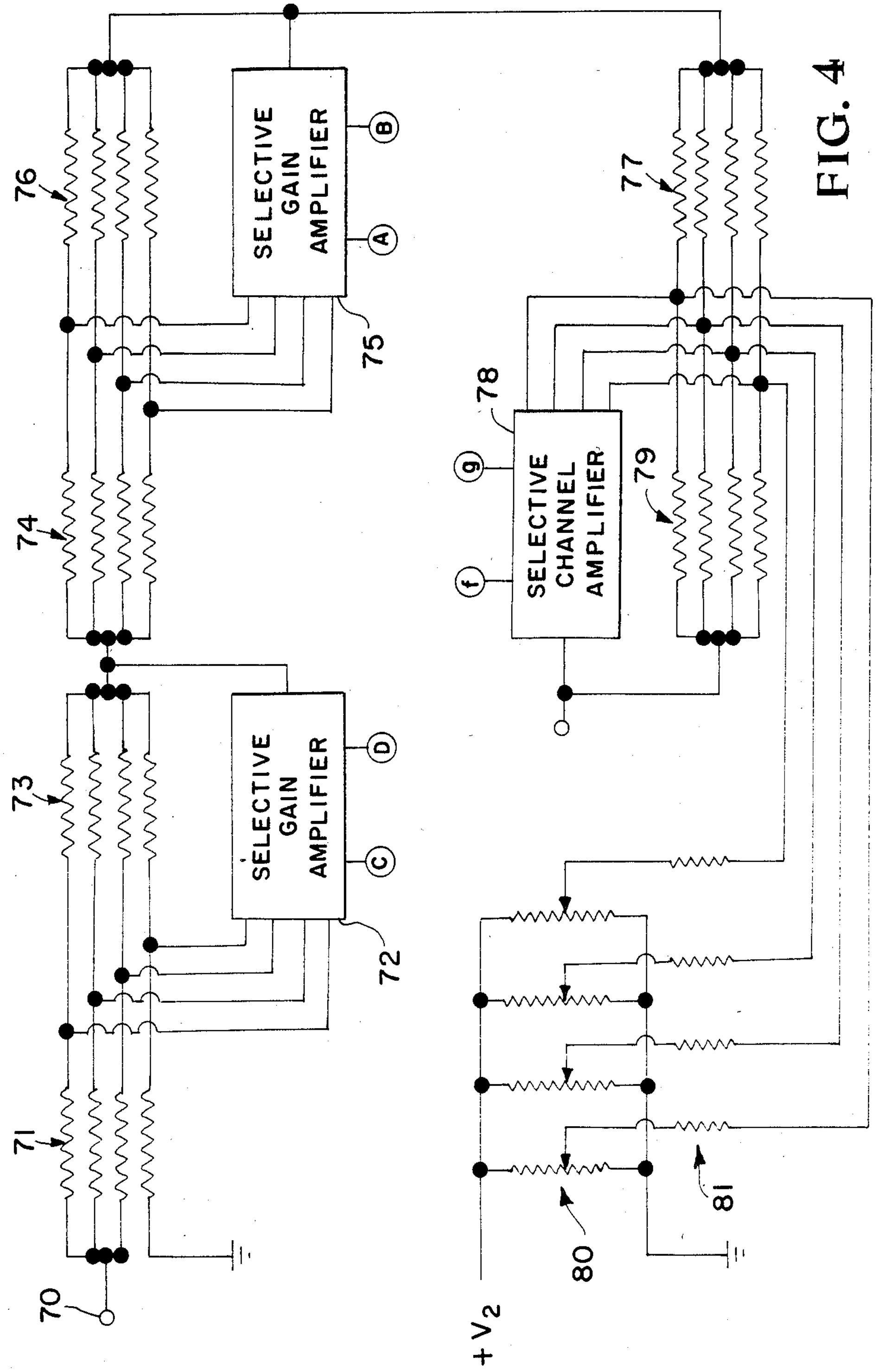

The four channel amplifier 27 as shown in FIGS. 3 and 4 includes a counter 40 to which the signals d and e are applied. The outputs of counter 40 are signals f and g as shown in FIG. 2. The input signals e cause the counter to count 00, 01, 10, 11 and then the signal d resets the counter to 00 and so forth. The signals f and g are applied to a decoder 41 which produces a negative signal h whenever f and g are 00, a negative signal i whenever f and g are 01, a negative signal j whenever f and g are 10, and a negative signal k whenever f and g are 11. The durations of these negative signals are the same as the time intervals. The signal h is applied to a channel 1 gain selector 42, the signal i is applied to a channel 2 gain selector 43, the signal j is applied to a channel 3 gain selector 44 and the signal k is applied to a channel 4 gain selector 45. Each of the gain selectors 42, 43, 44 and 45 has terminals 0, 1, 2, 3, 4, 5, 6, 7, 8 and 9, that can be independently manually selected. The terminals of each gain selector are connected to corresponding terminals 46. A voltage $+V_1$ is connected through resistors $R_A$, $R_B$, $R_C$ and $R_D$ to terminals A, B, C and D, respectively. Terminal 0 is floating, terminal 1 is connected through a diode 47 to terminal A; terminal 2 is connected through a diode 48 to terminal B; terminal 3 is connected through a diode 49 to terminal C; terminal 4 is connected through diodes 50 and 51 to terminals C and A, respectively; terminal 5 is connected through diodes 52 and 53 to terminals C and B, respectively; terminal 6 is connected through diodes 54, 55 and 56 to terminals C, B and A, respectively; terminal 7 is connected through diodes 57 and 58 to terminals D and A, respectively; terminal 8 is connected through diodes 59 and 60 to terminals D and B, respectively; and terminal 9 is connected through diodes 61, 62 and 63 to terminals D, B and A, respectively. The signal e is applied to a monostable multivibrator 64 which generates signals like h, i, j and k except the signals generated by monostable multivibrator 64 have a shorter duration. The negative signals generated by monostable multivibrator 64 have a duration such that they terminate a short time after a time interval begins. The signals generated by monostable multivibrator 64 are applied through diodes 65, 66, 67 and 68 to terminals A, B, C and D, respectively, providing signal blanking during system transition and settling time.

The multiplex measurements of mass spectrometer 20 are applied to a terminal 70 in FIG. 4. These measurements are applied through three or four parallel resistors 71 to a selective gain amplifier 72. One of the four parallel resisters 71 is connected to a circuit ground, and used as the amplifier input during signal blanking time, providing a predetermined blanking output level. Amplifier 72 is a four channel amplifier with the operative channel selected by the signals to terminals C and D. Resistors 73 are the feedback resistors for the four channels of amplifier 72. The ratios of the resistances of resistors 71 to 73 are different for each of the four channels thereby providing a different gain for each channel. The output of amplifier 75 is applied through four parallel resistors 74 to a selective gain amplifier 75. Amplifier 72 is a four channel amplifier with the operative channel selected by the signals on terminals A and B. Resistors 76 are the feedback resistors for the four channels of amplifier 75. The ratios of the resistances of resistors 74 to 76 are different for each of the four channels thereby providing a different gain for each channel. Consequently, the output of amplifier 75 is the signal at terminal 70 multiplied one of ten selected gains for each time interval or the blanking reference level selected during blanking time by monostable multivibrator 64.

The output of amplifier 75 is applied through four parallel resistors 77 to a selective channel amplifier 78. The operative channel is selected by the signals f and g. The resisters 79 are the feedback resistors for the four channels of amplifier 78. Resistors 77 and 79 are all equal thereby making the gains of the four channels of amplifier 78 equal to one. A group of four potentiometers 80 are connected across a voltage $+V_2$ with the slider of each potentiometer connected through a resistor 81 to one of the inputs of amplifier 78. With this arrangement the sliders of the different potentiometers 80 can be varied to vary the baselines within the different time intervals.

The selective channel amplifiers, counter, decoder, monostable multivibrator channel selectors, and chopper used are well known and therefore are not disclosed in detail in this specification.

In the operation of this invention, the feedback network including the phase detector 35 and VCO 36 automatically synchronizes the chopper 17 with the time intervals of the multiplexing. The operator, while viewing the repeating time frames on oscilloscope 27, varies phase shift control 34 to where all of the transitions 30 appear approximately at the centers of the time intervals. Then the operator varies potentiometers 80 until the baselines 31 are approximately equal. Thereafter the gain selectors 42, 43, 44 and 45 are varied until the amplitudes of the transitions during the four time intervals are approximately equal. Then the settings on the gain selectors are indicative of the measurements of the transitions in the four time intervals and can be inserted into the minicomputer 28 for the necessary calculations.

During, for example, the third time interval the signal j is being generated by decoder 41. This signal is applied to the channel three gain selector 44. Let us assume that gain selector 44 is set on terminal 5 as shown. Then diodes 52 and 53 will conduct during signal j (third time interval) reducing the voltage on terminals C and B to a low voltage. Terminals A and D remain at a high voltage $+V_1$. Hence, during the third time interval the binary representation of terminals A, B, C and D is 0110. The 10 binary signals on terminal C and D are applied to selective gain amplifier 72 to select a gain for that amplifier and the 01 binary signals on terminals A and B are applied to selective gain amplifier 75 to select a gain for the amplifier. The combined gains of amplifiers 72 and 75 is the gain selected by the terminal 5 setting of gain selector 44. The combined gains of amplifiers 72 and 75 can be any one of ten values as selected by the gain selectors 42, 43, 44 and 45. Gain selector 42 controls the gains in channel 1 (the repeating first time intervals), gain selector 43 controls the gains in channel 2 (the repeating second time intervals), and gain selectors 44 and 45 control the gains in channels 3 and 4, respectively.

The selective channel amplifier 78 is controlled by the f and g signals. These signals will sequentially switch amplifier 78 through its four channels. Potentiometers 80 are connected to the four channels to add a voltage to each of the four channels. Consequently, the baselines of the four channels can be independently varied by potentiometers 80. The negative signals generated by monostable multivibrator 64 and applied to diodes 65, 66, 67 and 68 keep the voltage on terminals A, B, C and D at a low level (for a fixed time) at the beginning of each time interval to allow for channel to channel system settling time.

The advantages of this invention are that it provides for time multiplexing the measurements from a chopped beam measuring system such that the measurements during each time interval are capable of digital averaging over many repetitions of time frames, such that the baselines and amplitudes of the measurements during each time interval can be independently varied, such that the chopping can be synchronized with the multiplexing, and such that the mass spectrometer channel transition can be blanked for a short period of time after it happens to allow for system settling time.

It is to be understood that the form of the invention herewith shown and described is to be taken as a preferred embodiment. Various changes may be made without departing from the spirit or scope of the invention as defined in the subjoined claims. For example, more or fewer than four measurements could be made and processed by the invention. and different apparatus from what is disclosed could be used to provide the different functions required by the invention.

What is claimed as new and desired to be secured by Letters Patent of the United States is:

1. A time multiplexing mass spectrometer measuring system comprising:
   - means for producing signals representing several different measurements of a substance;
   - means for time multiplexing the signals representing the said several different measurements on a single line wherein said means includes means for generating a timing signal during each time interval of each multiplexing time frame;
   - a chopper means for periodically interrupting the flow of said substance to said measuring system; and
   - means response to said timing signals for synchronizing said chopper means with said time intervals.

2. A time multiplexing measuring system according to claim 1 wherein said means for synchronizing said chopper means with said time intervals comprises:
   - means for producing a signal having a frequency equal to the frequency of said chopper means; and
   - phase detector means receiving said timing signals and said signal having a frequency equal to the frequency of said chopper means for producing a signal proportional to phase difference which signal is applied to said chopper means to change its frequency to thereby reduce the phase difference to zero.

3. A time multiplexing mass spectrometer measuring system comprising:
   - means for producing signals representing several different measurements of a substance;
   - means for time multiplexing the signals representing the several different measurements on a single line wherein said means includes means for generating a timing signal during each time interval of each multiplexing time frame;
   - a multi-channel amplifier means receiving said signals representing measurements wherein said amplifier means includes a different channel corresponding to each of said time intervals in a time frame;

means responsive to said timing signals for directing the signals in the different time intervals through the corresponding channels of said amplifier means;

means for independently varying the gain through each channel of said amplifier means; and wherein said measuring system is a chopped beam measuring system including a chopper and means for synchronizing said chopper with said time intervals.

4. A time multiplexing measuring system according to claim 3 including means for shifting the phase of said chopper with respect to said time intervals.

5. A time multiplexing measuring system according to claim 4 including means for independently varying the baseline in each channel of said amplifier means.

6. A time multiplexing measuring system according to claim 5 including means for blanking the measurement in each time interval for a short duration at the beginning of each time interval.

7. A time multiplexing system according to claim 6 including a means for displaying the output of said multi-channel amplifier means.

8. A time multiplexing measuring system according to claim 3 wherein said means for directing the signals in the different time intervals through the corresponding channels of said amplifier means includes means receiving said timing signals for generating counting signals up to the number of channels in said amplifier means and then repeating the count many times and means receiving said counting signals for directing the signals in the different time intervals through the corresponding channels of said amplifier means.

9. A time multiplexing measuring system according to claim 8 including means for independently changing the baseline in each of said channels.

10. A time multiplexing measuring system according to claim 5 including means responsive to said counting signals for generating on each of separate lines corresponding to said channels a signal during each time interval for that channel, and means in said amplifier means responsive to the signals on each of said lines for obtaining a selected gain of said amplifier means during the signals on that line.

11. A method for time multiplexing, mass spectrometer measurements by a chopped beam measuring system comprising the steps of:

making measurements and multiplexing the measurements in time intervals on a single line;

synchronizing the chopper in the chopped beam measuring system with said time intervals; and shifting the phase of said chopper such that a chopper transition appears at a desired location within each of said time intervals whereby the change in a measured signal due to a transition can be optimized.

12. A method according to claim 11 including the step of independently adjusting the baseline in each time interval to make the baselines equal in all time intervals.

13. A method according to claim 12 including the step of independently adjusting the transition measurement in each time interval to make the transition measurements equal in all time intervals whereby the amount of adjustment for each time interval is indicative of the measurement for that time interval.

14. A method according to claim 13 including the step of displaying said measurements on a display device to provide a visual aid in making the phase shifting, baseline and amplitude adjustments.

* * * * *